United States Patent [19]

Pierce

[11] 4,234,985
[45] Nov. 25, 1980

[54] PLASTIC BEE FRAME WITH REINFORCED SUPPORTING EARS AND NOTCHED FRAME BARS

[76] Inventor: Paul W. Pierce, 1630 W. 9th St., Upland, Calif. 91786

[21] Appl. No.: 938,500

[22] Filed: Aug. 31, 1978

[51] Int. Cl.³ .............................................. A01K 47/02
[52] U.S. Cl. ........................................................ 6/10
[58] Field of Search .................... 6/1, 2 R, 2 A, 10, 11

[56] References Cited

U.S. PATENT DOCUMENTS

| 106,377 | 8/1870 | Leonard | 6/2 R |
| 3,579,676 | 5/1971 | Pierce | 6/10 X |

FOREIGN PATENT DOCUMENTS 145502  2/1952  Australia ........................................ 6/10

*Primary Examiner*—Louis G. Mancene
*Assistant Examiner*—Robert P. Swiatek
*Attorney, Agent, or Firm*—W. Britton Moore

[57] ABSTRACT

A unitary molded plastic bee frame including a molded plastic honeycomb foundation, and wherein integral ears are formed on and project laterally from opposing upper ends of the frame bars, with the ears having thin top and end walls, a thickened midrib extending endwise thereof, and a thickened lower wall projecting through the end frame bars acting as a brace and reinforcement for the ears. An angled brace projecting between the lower and upper ear walls additionally strengthens the ears so they will support the frames in a super to prevent detachment thereof and dislodgement of the frames. The lower ends of the frame end bars are reduced in width by notching to enable vertical alternate stacking in cartons to increase the number of frames per carton and decrease the weight thereof.

8 Claims, 6 Drawing Figures

PLASTIC BEE FRAME WITH REINFORCED SUPPORTING EARS AND NOTCHED FRAME BARS

This invention relates to a unitary molded plastic bee frame having integral laterally projecting supporting ears with thickened reinforcing midribs and lower walls, and angled braces for additionally strengthening the ears, and wherein the lower ends of the frame end bars are notched to permit alternate vertical stacking of the frames in a carton.

While it has been proposed to arrange and support bee frames in a super by ears formed thereon, such as the frame shown in U.S. Pat. No. 3,579,676 to Paul W. Pierce, these ears are fragile and constitute weak suspension points, and are easily broken and detached so that the frames of honey therein tend to be dislodged from the supers, with incident loss of honey and inconvenience to the beekeeper.

The principal object of the present invention is to provide a unitary molded plastic bee frame including a permanent molded plastic honeycomb foundation integrally joined to the frame bars, and wherein integral ears project from the end frame bars and wherein some of the walls thereof are thickened and so braced therebetween that the possibility of detachment of the ears and dislodgement of the frames from the super is prevented or materially reduced.

Another object is the provision of integral frame supporting ears having thin top and end walls, thickened midribs extending endwise thereof, thickened lower walls projecting through the end frame bars and angled braces between the lower and upper walls to materially strengthen, reinforce, and reduce the possibility of the ears being dislodged therefrom.

A further object is to provide a unitary molded plastic bee frame wherein the lower ends of the unitary plastic frame bars are reduced in width by notching to permit of the frames being alternately and reversibly and vertically stacked in a carton with alternate frames having their ears uppermost and adjacent frames therebetween having their ears lowermost to provide multiple frame nesting with increased frame packing and decreased weight and more frames per cubic foot.

These and other objects and advantages will be apparent as the specification is considered with the accompanying drawings, wherein FIG. 1 is a perspective view of a beehive with frames assembled in the super thereof;

Figure 1:
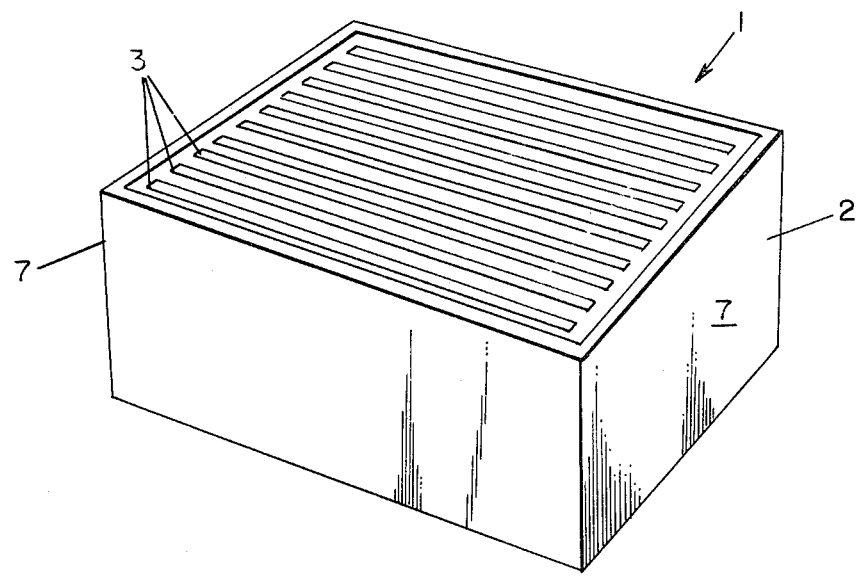
Figure 2:
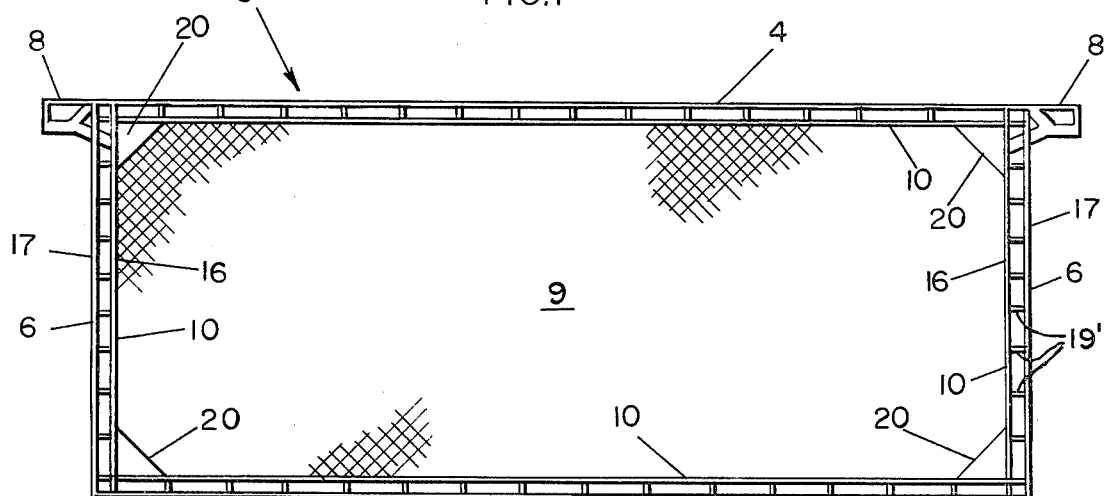
FIG. 2 is a side view of a unitary plastic bee frame with reinforced ears thereon.
Figure 3:
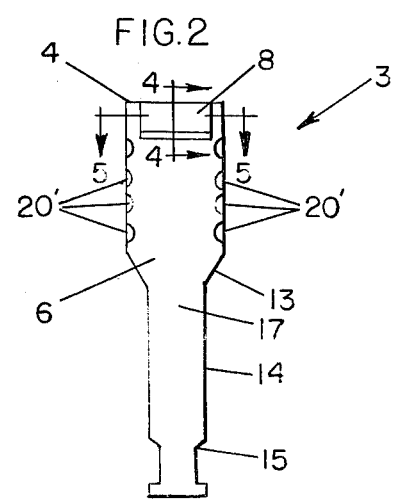
FIG. 3 is an end view of a frame.

Referring more particularly to the drawings, wherein similar reference characters designate like parts throughout the several views, numeral 1 generally indicates a beehive including a super 2 containing a plurality of bee frames 3 having top and bottom frame bars 4 and 5, and side bars 6 arranged side by side therewithin. Suitable support or hanger racks, not shown, having notches are provided on the end walls 7 of the super to support and locate the bee frames laterally relative to one another. Each of the frames are formed with integral, rigid ears 8 projecting laterally from each of the side frame bars 6 at the upper ends thereof which ears fit snugly in the rack notches and positively locate the frames relative to each other at both their upper and lower edges.

The bee frames 3 are identical and of a unitary molded plastic construction including a comb foundation 9 arranged with a central rectangular open area. This comb foundation is joined about its edges to the frame bars 4–6 along the longitudinal center lines thereof so that the foundation is inset relative to the side edges of these bars. The latter are spacedly double-ribbed, as at 10, for reinforcement, and the top frame bar 4 of each frame is wider than the bottom frame bar 5, and the side frame bars 6 project slightly beyond the side edges 11 of the top bar 4, as at 12, to provide a widened upper end on each side frame bar which extends to a point approximately midway between the top and bottom frame bars where it tapers inwardly, as at 13, into an elongated somewhat narrower section 14 of each side bar. This section 14 is notched or tapered inwardly, as at 15, at its lower end, for a purpose presently to be described.

In view of the double ribbed construction 10 of the frame bars, as well as the spaced inner and outer walls 16–17 thereof extending to either side of the peripheral edges 18 of the comb foundation 9, flat reinforcing struts 19' spacedly extend therebetween throughout their height. As bees forming honey in the hexagon cells of the comb foundation tend to become trapped between the frames when they are pushed tightly together in the super, a series of spaced concave, half-mooned shaped, notches 20' are formed in each edge 19 of the widened top portions of the side frame bars and permit the escape of bees therethrough.

Arranged in each corner of the frame and extending triangularly between the inner walls 16 of the frame bars is a thickened reinforcing web 20 which serve to strengthen the frame. While the triangular webs 20 at the lower corners of the frame may be eliminated, particularly in smaller dimensioned and lighter frames for use in reduced size bee hives, it is important that the webs at the upper corners be included in every frame, as these areas are subjected to the most stress and require reinforcement.

Figure 4:
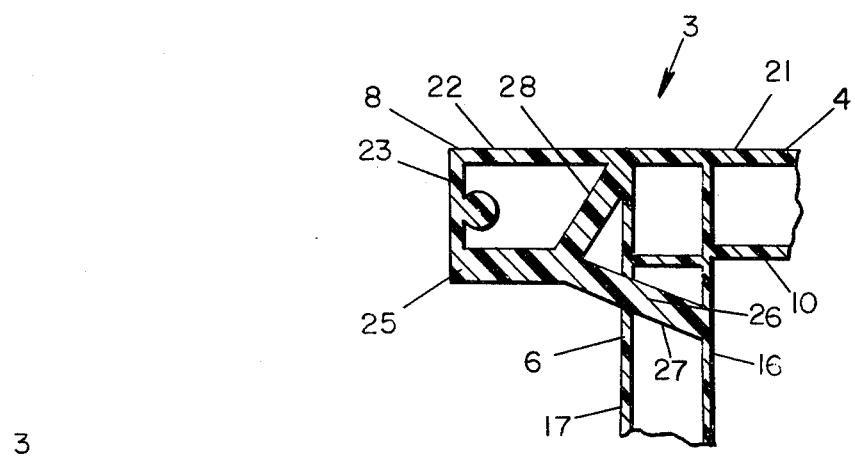
FIG. 4 is an enlarged section on the line 4—4 of FIG. 3.
Figure 5:
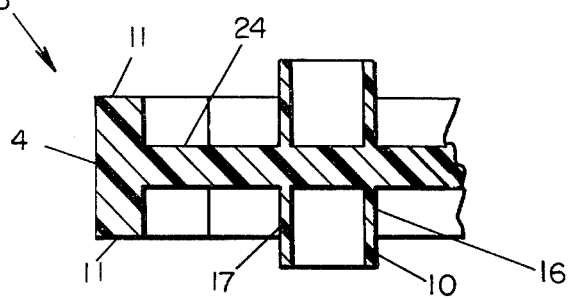
FIG. 5 is an enlarged section on the line 5—5 of FIG. 3.

Referring particularly to the ears 8, which serve to locate and support the frames in the super, it is to be understood that these areas are subjected to the most stress, but generally constitute the weakest points in a bee hive. Accordingly, it is essential that these areas be strengthened so that the ears cannot be accidentally disengaged from the frames. Each ear 8 extends laterally from an end of the top frame bar 4 and is generally of hollow rectangular formation, with a relatively thin flat upper wall 22 which is an extension of the relatively thin flat upper wall 21 of top frame bar 4, a relatively thin vertical end wall 23, and a central thickened rib 24 located in the plane of the comb foundation 9 and which is an extension thereof. The bottom wall of each ear is flat, horizontal, and thickened, as at 25, to a point midway between end wall 23 and the outer wall 17 of the double-ribbed side frame bar 6, when it is angled downwardly and inwardly as at 26, to its juncture with wall 17. This angled section 26 of the bottom wall 25 is correspondingly thickened, and continues to angularly span or bridge the inner and outer walls 16–17 of the side frame bar, as at 27, and is of the same thickness as the entire bottom wall. At the midway point of bottom wall 25, between walls 23 and 17, a thickened brace 28 projects upwardly and inwardly to the juncture between the upper end of wall 17 and the inner end of the thin flat upper wall 22. Thus, it will be apparent that each ear is reinforced and strengthened by the thickened center rib 24, thickened bottom wall 25 and thickened angled sections 26–27 thereof, and the thickened angular brace 28, so that the ears will resist any sudden stresses or strains applied upwardly or downwardly thereagainst and will securely support the frames in the super. While the thickened angular extension 27 of bottom wall 25, between spaced side bar walls 16–17, is angularly disposed, it may extend horizontally therebetween and generally parallel to thinner top wall 22 of the ear, or it may extend at a lesser angle than that shown in FIG. 4.

While it is usually preferable that the top and end walls of the ears be thinner than the bottom walls 25, angular extensions 27, and braces 28, it is to be understood that all of these walls may be of the same thickness, in which event, all of the walls will be thickened, as now indicated in the drawings.

Figure 6:
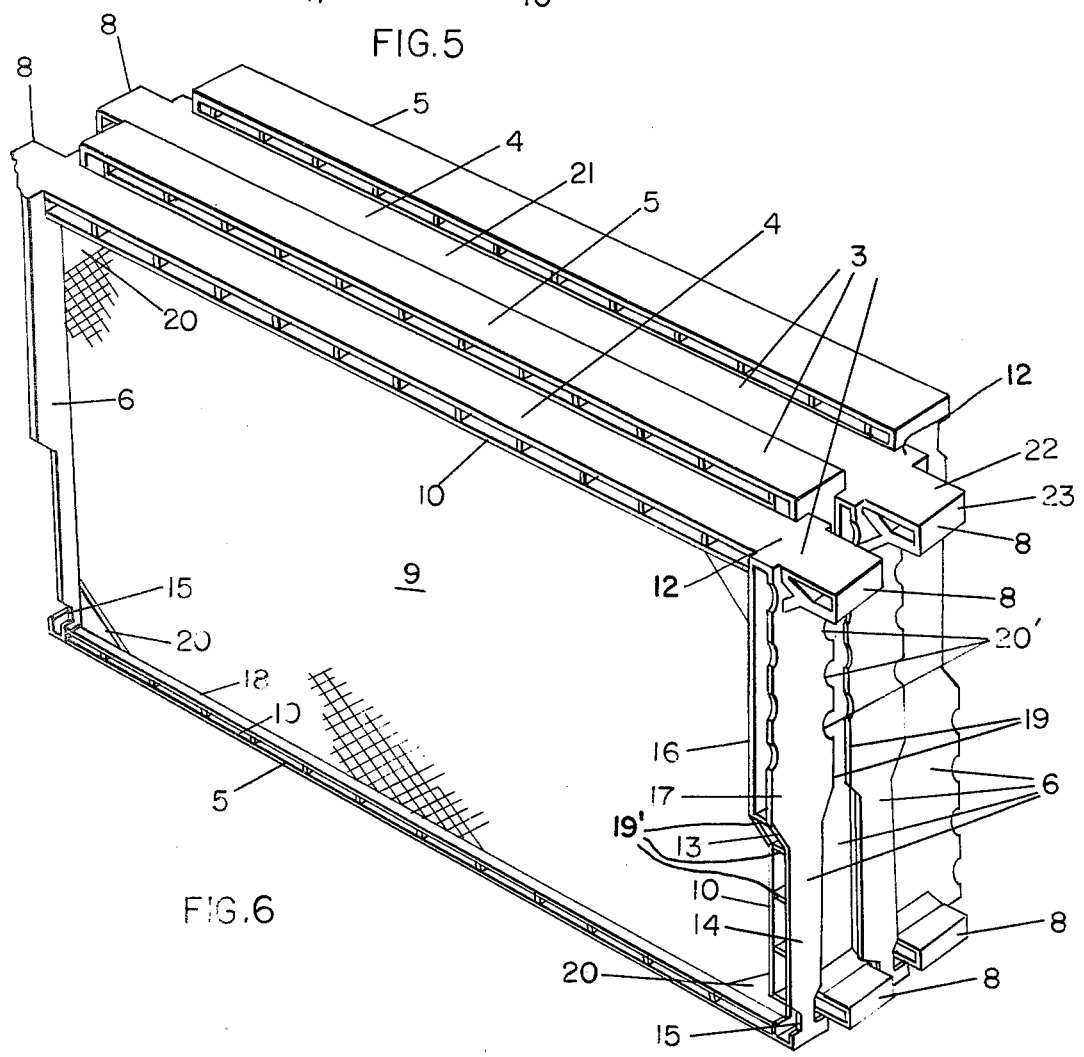
FIG. 6 is a perspective view of a group of frames in the positions assumed when vertically stacked for packing.

When it is desired to store and/or package a group of frames in a carton, not shown, for shipment, the frames are arranged or stacked, as best shown in FIG. 6, in a flat and parallel manner, and in an alternate or staggered formation. For example, the first frame 3 will be disposed with the top frame bar 4 and ears 8 uppermost, and the next frame 3 will be inverted so that the bottom frame bar will be uppermost and the top frame bar 4 lowermost, which sequence will be repeated until the desired number of tightly packed and nested frames snugly and completely fill the carton. By virtue of this arrangement, it will be noted that the ears 8 on alternate frames will project laterally beyond the outer end walls 17 of the side frame bars 6 at each end, and will be flush with and engage the end walls of the carton. The bottom frame bars 5 will alternately project above and below the ears 8 so that the flat bottom faces of the bars 5 will alternately project above and below the ears 8, and the flat bottom faces of bars 5 will be flush with and engage the top and bottom walls of the carton. That is, the ears 8 engage the end walls of the carton, and the lower frame bars 5 engage the top and bottom carton walls and securely retain the nested frames therein.

While a preferred embodiment of bee frame has been shown and described, it is to be understood that various changes and improvements may be made therein without departing from the scope and spirit of the appended claims.

What I claim is:

1. A plastic bee frame for vertical positioning in a beehive super, said frame having opposing end walls comprising top, bottom, and end frame bars joined end to end in an open generally rectangular configuration and defining a central generally rectangular opening in said frame, a plastic honeycomb foundation arranged within said central opening and integrally joined about its perimeter to said frame bars, generally rectangular plastic ears integrally joined to and projecting from the upper ends only of said end frame bars longitudinally of said top frame bar, said ears having flat top, bottom, and end walls, and being open at the sides, said flat bottom walls spanning and joined to said end frame bars, and brace means of substantially the same thickness as said bottom walls extending upwardly and inwardly at an angle between and joining said bottom and top walls whereby said ears are reinforced and strengthened and prevented from becoming dislodged therefrom and disturbing said frames as the latter are supported in the super.

2. A plastic bee frame, according to claim 1, wherein said flat bottom walls are thicker than said top and end walls.

3. A plastic bee frame, according to claim 1, wherein each end frame bar has a widened upper end extending to a point approximately midway between the top and bottom thereof, and the lower end thereof is narrower.

4. A plastic bee frame, according to claim 3, wherein the lower ends of said end frame bars are notched inwardly to reduce the width thereof and permit said frames to be arranged in nested formation with alternate frames being inverted to form a tight pack of frames for storage and shipment in a carton.

5. A plastic bee frame, according to claim 3, wherein apertures are formed in said widened upper ends to permit the escape of bees trapped between said frames.

6. A plastic bee frame, according to claim 5, wherein said apertures are notched in the edges of said widened upped ends.

7. A plastic bee frame, according to claim 1, wherein said flat bottom wall of each ear is horizontally arranged to a point midway between the ends thereof, and said wall then extends inwardly and downwardly at an angle.

8. A plastic bee frame, according to claim 1, wherein said frame comprises double-rib top, bottom, and end frame bars, and said flat bottom walls span and are joined to said double-rib end frame bars.

* * * * *